United States Patent [19]
Spooner

[11] 3,761,797
[45] Sept. 25, 1973

[54] ELECTRICAL FILTERS
[75] Inventor: Frederick Ernest Spooner, Crawley, England
[73] Assignee: Brentford Electric Limited, Crawley, Sussex, England
[22] Filed: Dec. 7, 1971
[21] Appl. No.: 205,670

[30] Foreign Application Priority Data
Dec. 8, 1970 Great Britain.................. 58,290/70

[52] U.S. Cl..................................... 321/10, 323/45
[51] Int. Cl. ............................................. H02m 1/14
[58] Field of Search .................... 323/1, 45; 321/10; 333/79

[56] References Cited
UNITED STATES PATENTS
2,630,557  3/1953   Bixby............................. 321/10 X
2,242,881  5/1941   Finch et al...................... 333/79 X
1,965,661  7/1934   Loftis............................. 321/10 X
2,751,548  6/1956   Gunderson...................... 333/79 X
3,474,346  10/1969  Schaefer......................... 321/10 X OTHER PUBLICATIONS
Higuchi, "Active Equivalent Series Resistance Filter," IBM Technical Disclosure Bulletin, Vol. 14, No. 2, July 1971, pages 523, 524.

Primary Examiner—A. D. Pellinen
Attorney—John A. Mawhinney

[57] ABSTRACT

A ripple filter in which the magnetic flux in the core of a series choke due to direct current through the primary winding forming the choke is opposed by an equal flux through a secondary winding to keep the core out of saturation. Alternatively or additionally the ripple current is opposed by an anti-phase current through a secondary winding on the core in order to reduce the ripple actively.

3 Claims, 3 Drawing Figures

ELECTRICAL FILTERS

FIELD OF THE INVENTION

This invention relates to electrical filters and particularly to filters used to remove a periodic component (usually called "ripple") from a direct current.

BACKGROUND OF THE INVENTION

Ripple can be partially removed from a direct current by a filter which includes a series choke, namely a choke in series with a load. The choke usually has a magnetic core in order to increase the inductance of the choke and thereby its effectiveness, especially in respect of the reduction of ripple due to the frequency of an alternating current supply. However, the direct component of the current through the choke tends to saturate the core which, when saturated, renders the choke of relatively low impedance and thereby less effective for reducing ripple. The tendency of the core to saturate can be reduced by the introduction of an air-gap in the magnetic circuit, but this lowers the inductance of the choke.

Another problem associated with the reduction of ripple is that the removal of ripple of small amplitude can become very inefficient if the filter is purely passive: another aspect of the invention is concerned with the active reduction of ripple in a direct current fed through a filter which includes a choke.

SUMMARY OF THE INVENTION

According to the present invention, in filtering a ripple component by means of a series choke which has a primary winding on a magnetic core, the magnetic flux produced in the core by either the ripple component or the direct component or both components of the current through the winding is opposed by a flux produced by current through a secondary winding.

The present invention also particularly provides a filter comprising a series choke which has a primary winding on a magnetic core, means for deriving a feedback signal from a component of a current passing through the said winding, and a secondary winding which is magnetically linked to the primary winding by means of the core and is arranged to receive the feedback signal effectively in opposition to the said component in the primary winding.

The effect of the feedback signal will depend on the component from which it is derived. There may be provided means for developing a direct current in accord with and in response to the direct component of the current through the primary winding; this direct current may be applied to the secondary winding so as to produce in the core on which the two windings are disposed a magnetic flux in opposition to the flux produced in the core by the said direct component. By these means it is possible to reduce, substantially to zero, the net magneto-motive force in the core due to the magnetic fluxes of the direct currents and thereby substantially reduce the tendency to saturation mentioned hereinbefore. Accordingly the choke can, preferably in conjunction with other passive reactive components, such as a shunt capacitor, more effectively impede the passage of ripple. For developing the feedback signal for this purpose, there may be provided a resistor in series with the primary winding and means for amplifying a voltage developed across the resistor.

Because the flux produced in the core depends not only on the current applied to a winding on the core but also on the number of turns of that winding, it is unnecessary to amplify the feedback signal to the amplitude of the component that it opposes.

The feedback signal may, additionally or alternatively, be derived from the periodic component of the signal passing through the primary winding. In this case the application of a periodic feedback signal to the secondary winding will cause, by transformer action, the induction of a signal directly opposing the periodic component from which the feedback signal is derived. This provides a means of automatically reducing by means of feedback the ripple content and likewise renders the choke more effective for reducing ripple.

BRIEF DESCRIPTION OF THE ACCOMPANYING DRAWINGS

DESCRIPTION OF THE PREFERRED EMBODIMENTS

Figure 1:
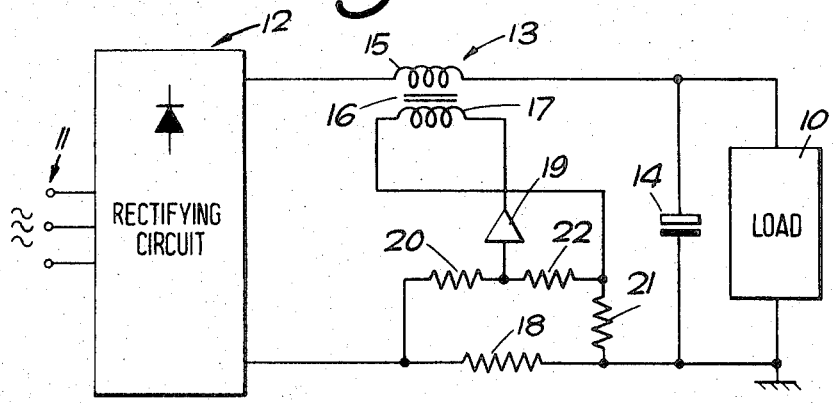
FIG. 1 is a schematic diagram of an electrical circuit incorporating one embodiment of the invention.

The circuit of FIG. 1 is primarily intended for the production of a smooth direct current through a load 10. The circuit has input terminals 11 for receiving an alternating current, normally from a polyphase source. The input terminals are coupled to a rectifying circuit 12, which may include a bridge or other circuit of diodes, thyristors or other non-linear elements, so as to provide at the output terminals of the circuit 12 an output having a substantial component of direct current. Normally the output contains also substantial ripple, namely periodically fluctuating components related to the frequency of the alternating current input.

A filter is provided between the rectifying circuit 12 and the load 10 to reduce the ripple on the direct current. The filter comprises a series choke 13 and a shunt capacitor 14. The choke 13 comprises a winding 15 (hereinafter called "primary" winding) on a magnetic core 16 which may be toroidal and made of grain-oriented steel.

The direct current that passes through the filter to flow in the load produces magnetic flux which tends to saturate the core 16 and to render it thereby of low impedance to the periodic components of the signal applied to the filter. This tendency to saturate is reduced by the production of opposing flux in accord with the direct component of the signal applied to the choke.

A resistor 18 is in series with the load. One end of the resistor 18 is connected to the input of a linear amplifier 19 by a resistor 20 whereas the other end of the resistor is connected to the input of the amplifier by the series resistors 21 and 22. The amplifier feeds current to a secondary winding 17 on the core 16 to produce flux in opposition to the flux produced by the direct component of the current through the primary winding 15. It is normally appropriate to reduce to zero the net magneto-motive force in the core due to the currents $i_1$ and $i_2$ in the windings 15 and 17 respectively. Then the core will not be saturated by the direct current through the winding 15 and the impedance of the primary winding 15 to ripple can remain high. If the numbers of turns on the winding 15 and 17 are $N_1$ and $N_2$ then the fluxes in the core due to the currents $i_1$ and $i_2$ are proportional to $i_1N_1$ and $i_2N_2$. It is therefore obviously not necessary for the amplifier to have a gain sufficient to make $i_2$ equal to $i_1$ provided that the ratio of the numbers of turns is chosen so that $i_1/i_2 = N_2/N_1$.

Preferably the resistors are chosen in order to obtain a properly balanced circuit; the resistances $R_1$, $R_2$, $R_3$ and $R_4$ of the resistors 18, 21, 20 and 22 respectively should be such that $i_1/i_2 = R_2R_3/R_1R_4$.

Figure 2:
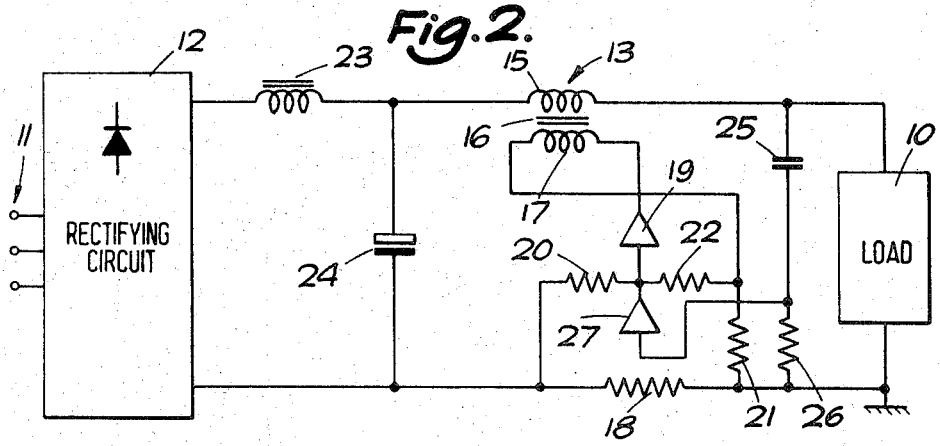
FIG. 2 is a schematic diagram of an electrical circuit incorporating another embodiment of the invention.

FIG. 2 illustrates a circuit in which the ripple component of the signal passing through the choke is used to derive a feedback signal in opposition, i.e., in antiphase, to the ripple component of the signal applied to the choke, in order to assist in the removal of ripple from the load current. As will be seen, the choke for this purpose forms in effect part of a transformer.

The circuit of FIG. 2 includes the components of the circuit of FIG. 1. As has been described with reference to FIG. 1, the net flux due to the direct currents flowing in the winding 15 and the winding 17 is preferably reduced to zero. However, the direct current flowing in the winding 17 has a periodic component which is derived from and is effectively in opposition, i.e., antiphase to the periodic component of the current in the winding 15.

In parallel with the load 10 is a series combination of a capacitor 25 and a resistor 26; the junction between the capacitor and the resistor 26 is coupled to an amplifier 27 which feeds an amplified output to the amplifier 19. The capacitor 25 prevents the passage of any direct current into the amplifier 27 which is accordingly energised by the ripple component. The gain and phase shift characteristics of the amplifiers 27 and 19 can readily be designed so that the signal applied to the winding 17 contains a periodic component which corresponds to but is in anti-phase to the ripple content of the signal applied to the winding 15. The two windings 15 and 17 of the choke form, as far as periodic signals are concerned, a transformer so that there is induced in the main winding 15 a periodic signal in opposition to the periodic component of the signal applied to the choke from the rectifier circuit 12. Thus the ripple content of that signal is automatically reduced by means of feedback towards zero. Although this method of reduction of the ripple content might be used on its own, it is preferable to associate it with the reduction of the net flux due to the direct currents. Moreover, it may be found in practice that it is necessary to reduce otherwise the ripple very substantially before reducing ripple in this manner. FIG. 2 illustrates the incorporation of a preceding stage of filtration, namely a series inductor 23 and a shunt capacitor 24.

It will be understood that in the circuit of FIG. 1 and the circuit of FIG. 2 the electrical parameters of respectively, the inductor 13 and capacitor 14 and the inductor 23 and capacitor 24 are chosen to provide frequency dependent attenuation in accord with the range of periodic components that must be reduced.

Figure 3:
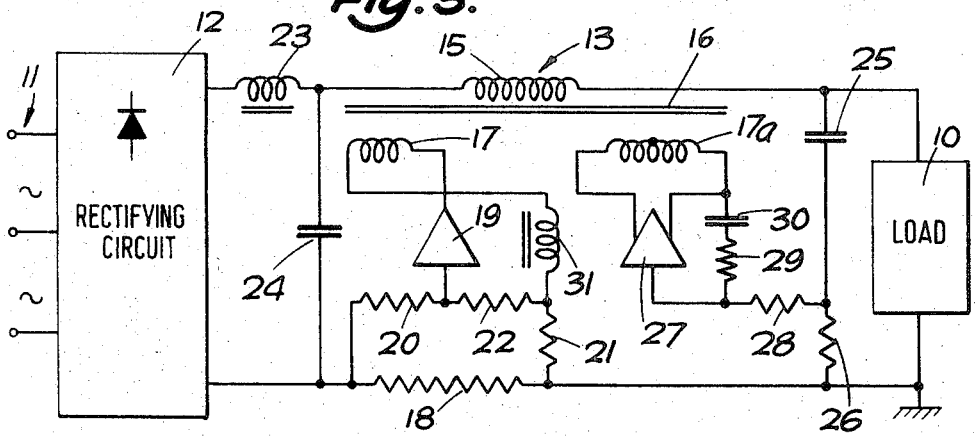
FIG. 3 is a schematic diagram of a circuit incorporating a third embodiment of the invention.

FIG. 3 illustrates a circuit in which the balance of fluxes in the core due to direct currents and the active reduction of the ripple content, as described previously with respect to FIGS. 1 and 2 respectively, are both provided. In FIG. 3, components corresponding to those previously described with reference to FIGS. 1 and 2 have matching reference numbers.

In the circuit of FIG. 3, the magnetic flux in the magnetic circuit of the series choke 13 due to the direct component of the current through the primary winding 15 is balanced by the magneto-motive force of the flux produced by a first secondary winding 17 which is fed from the amplifier 19 as described with reference to FIG. 1. In series with the winding 17 is a choke 31 which serves to attenuate the circulation of harmonic currents through the amplifier 19 and its associated circuit. Such an additional choke can be provided in the circuit shown in FIG. 1.

Another secondary winding 17a is carried on the same core 16. The winding 17a is used effectively to reduce actively the ripple content of the current through the winding 15. In parallel with the load 10 is the series combination of the capacitor 25 and resistor 26 as described earlier. The junction between this capacitor and resistor is connected through a resistor 28 to the input of an amplifier 27 which drives the winding 17a in push-pull, in order to avoid any standing bias in the flux produced by that winding. The centre-tap of this winding is connected to the positive terminal of a voltage supply for the amplifier 27, the more negative terminal of the supply being suitably connected to that amplifier.

Between one end of the winding 17a and the input of the amplifier 27 is connected a branch comprising a resistor 29 and a capacitor 30 in series. The values of these two components and the resistor 28 would be chosen to ensure the correct gain and phase shift in the amplifier 27.

In the foregoing, the current through a secondary winding is provided automatically. It may be possible in some circumstances, when the currents in the circuit are steady, to provide a fixed current through the secondary winding or each secondary winding in accord with a value obtained by a suitable ammeter for the direct or periodic component of the current through the primary winding.

I claim:

1. A filter circuit comprising a source of rectified electric current having a direct component and a ripple component, a load therefor, a choke winding in series between the source and the load, a magnetic core carrying said choke winding, a secondary winding on said core and a feedback circuit including said secondary winding, and resistive means disposed for receiving said direct component and proportioned to develop a direct current in fixed proportion to said direct component and means for feeding said direct current through said secondary winding, said direct current having a magnetic effect on said core in substantially complete opposition to the magnetic effect on said core of said direct component; said means for receiving the direct component comprising a first resistor means in series with said load and said feedback circuit includes second, third and fourth resistor means coupled in series in a branch in parallel with said first resistor means, said resistor means determining the proportionality of said direct current and said direct component, said feedback circuit further comprising amplifier means connected in series with said secondary winding across said third resistor means.

2. A filter circuit according to claim 1 further comprising a circuit path in parallel with said load, means in said circuit path for blocking direct current, and further circuit means coupling said path to a secondary winding on said core, said further circuit means and said latter winding coupling to said choke winding an alternating current in phase opposition to said ripple component.

3. A filter circuit according to claim 2 wherein the said further circuit means comprises an amplifier coupled to drive said latter winding in push-pull.

* * * * *